United States Patent [19]

Landre et al.

[11] 3,718,751

[45] Feb. 27, 1973

[54] OPTICS FOR HIGH SENSITIVITY COLOR TELEVISION CAMERA

[75] Inventors: John K. Landre, Menlo Park; Donald D. Kline; Marc W. Broemmelsiek, both of Palo Alto, all of Calif.

[73] Assignee: Commercial Electronics Incorporated, Mountain View, Calif.

[22] Filed: Oct. 12, 1970

[21] Appl. No.: 79,848

[52] U.S. Cl. ............................178/5.4 E, 178/5.4 TC

[51] Int. Cl. ................................................H04n 9/08

[58] Field of Search......178/5.4 C, 5.4 TC, 5.4, 7.86; 350/166, 169, 171

[56] References Cited

UNITED STATES PATENTS

| | | | |
|---|---|---|---|
| 3,255,304 | 6/1966 | Bendell | 178/5.4 TC |
| 3,333,053 | 7/1967 | Back | 178/5.4 TC |
| 3,497,283 | 2/1970 | Law | 350/148 |
| 3,547,521 | 12/1970 | Ichizuka et al. | 350/171 |

FOREIGN PATENTS OR APPLICATIONS

| | | | |
|---|---|---|---|
| 881,830 | 11/1961 | Great Britain | 178/5.4 C |
| 1,168,763 | 4/1963 | Germany | 178/5.4 TC |

*Primary Examiner*—Robert L. Richardson
*Attorney*—Townsend & Townsend

[57] ABSTRACT

An optical system for high sensitivity television cameras employing parallel blue, green and red television tubes with one of the tubes being aligned with an optical aperture of the camera. A trichroic filter splits off a green image portion of the image received from the aperture and directs it via a green mirror to the green television tube. The remainder of the received image is passed to a dichroic filter which has a transmission cutoff point in the light wave band reflected by the trichroic filter and which reflects the blue image portion via a trim mirror to the blue television tube and transmits the red image portion to the red television tube. The reflecting surfaces of the filters and the mirrors are disposed at 45° to the incident light and are constructed so that their spectral transmission-reflection characteristics are insensitive to light polarization. The tubes, filters, mirrors and other components of the optical system are mounted to a relatively massive optical bench preventing image distortions and movement of the components under temperature changes, vibration, shock and the like. Means are also provided to operate the camera aperture, neutral density and color filters that can be swung into the light path through the camera from an end of the camera remote from the aperture.

18 Claims, 8 Drawing Figures

OPTICS FOR HIGH SENSITIVITY COLOR TELEVISION CAMERA

BACKGROUND OF THE INVENTION

Prior art color television cameras have a relatively low light sensitivity. They require extensive artificial illumination to obtain satisfactory output signals or, where such illumination is not present as during output television filming, color television is not available. Prior art television cameras are relatively bulky, require significant warm-up periods of as much as one hour, are optically not as stable as desired, and have a relatively low optical efficiency in their color image splitting system which further increases the light intensity required for satisfactory color television images.

One type of prior art color television cameras employs beam splitting prisms for splitting incoming light into different color images for transmission to the color television tubes of the camera. Such prisms are relatively bulky and massive, have a tendency to increase the spacing between the tubes and thus increase the overall size of the camera. More seriously, however, the prisms require long warm-up periods due to their massiveness. Failure to observe the necessary warm-up periods results in optical distortions and relatively low quality television images until the full prism mass has been brought to its operating temperature.

Other prior art television cameras employ dichroic filters which successively split the red and blue image portions from the green image portions for transmission to perpendicularly arranged or angularly inclined television tubes. Some of the shortcomings encountered with prisms are alleviated with the dichroic filters. However, dichroic filters are sensitive to the angle of incidence of incoming light. With an increasing angle of incidence the effects of polarized light, namely changes in the spectral transmission or reflection characteristics of the filters, increases. These changes result in an imbalance of the light received by the tubes. Thus, television image color shifts are relatively common when such cameras are directed at scenes transmitting polarized light. For example, if the camera is directed at blond hair, the hair might appear green on the screen.

To avoid such color distortion, dichroic filters were placed at angles of substantially less than 45° to the incident light. Such placement of the filters, however, is undesirable because it prevents the parallel, adjacent positioning of the television tubes in the camera. Thus, the aft ends of the tubes ends were spaced relatively far apart. Since tubes acceptable for use in color television and particularly high sensitivity tubes are relatively large and bulky such a positioning could significantly add to the overall size of the camera and thereby make it more difficult to handle.

SUMMARY OF THE INVENTION

The present invention provides an optical system for color television cameras, and particularly for high sensitivity cameras capable of providing satisfactory television output signals under much lower minimum light intensities than was possible in the past. Such high intensity cameras employ three, e.g. blue, green and red secondary electron conduction vidicon tubes such as the television tubes sold by the Westinghouse Electric Corporation of Elmira, New York, under the designation WL-30893 SEC Camera Tube.

Briefly, the optical system of the present invention for such cameras comprises an optical band pass filter removing from an image projected by a camera lens all but image portions having trim edge wavelengths between ultraviolet and infrared wavelengths. First filter means reflects a green image portion having upper and lower trim edges within the wavelength of light passing through the band pass filter and transmits the remainder of the light. The second filter means reflects light of a wavelength between one of the trim edges and a light wavelength reflected by the first filter means. The trim edges of the first and second filter means separates the band pan filter image into a green image portion, a blue image portion and a red image portion. Mirror means are provided and positioned to reflect the color image portions reflected by the first and second filter means in a direction parallel to the direction in which the second filter means transmits a color image to enable the parallel positioning of the color image receiving television tubes.

The first filter means employed by the camera of the present invention comprises a first dichroic filter, that is a filter that reflects light of a relatively narrow band width and permits the transmission of light on either side of the reflection light band. The dichroic filter is constructed to reflect the green image portion of the incoming light via a green mirror or dichroic mirror that again reflects green but transmits all other light. Any ghost images from secondary reflections by the second, optically downstream facing surface of the trichroic filter are thereby eliminated. The second filter means comprises another dichroic filter which transmits all light above a given wavelength and reflects all light below a given wavelength. That wavelength falls somewhere between the light band reflected by the first filter. The actual cutoff point is not critical since on either side of the cutoff point no light is transmitted by the first filter.

Thus, the first filter controls not only the band width of green light reflected by it but also controls the short wave side of the red image portion transmitted by the second dichroic filter and the long wave side of the blue image portion reflected by the second dichroic filter. The long wave side of the red image portion and the short wave side of the blue image portion are controlled by the conventional band pass filter. The second dichroic filter need not be subjected to critical manufacturing tolerances and can therefore be obtained at relatively low cost. Similarly the manufacture of band pass filters is well known and they are readily available at low cost.

Although prior art dichroic filters were subject to the earlier stated control of the angle of incidence of incoming light to prevent undesirable side effects from light polarization, it has been determined that with a dichroic filter manufactured by the Optical Coatings Laboratory, Inc., of Santa Rosa, California, such side effects from polarized light are virtually eliminated. The materials and the manufacturing process employed in the manufacture of the dichroic filters by the Optical Coatings Laboratory, Inc. are not known to applicants and are a trade secret of the Optical Coatings Laboratory, Inc. The filters are available from the Optical Coatings Laboratory, Inc. and are usually designated as "trichroic filters".

Dichroic filters manufactured by the Optical Coatings Laboratory, Inc. have a spectral transmission-reflection characteristic which is insensitive to polarization. That is, if incoming light is polarized in the vicinity of the filter cutoff or trim edge, that is the wavelength at which the filter changes from transmission to reflection or vice versa, no noticeable shift in the trim edge is encountered even though the angle of incidence is 45°. Consequently, the color balance between the three tubes remains constant and unaffected by polarized light.

A 45° positioning of the dichroic filters and the associated mirrors enables 90° reflections of the color image portions whereby the television tubes can be mounted parallel, side-by-side as closely as physically possible. The ends of the tubes are, therefore, no longer spread apart. A compact camera designed is thus obtained which substantially facilitates the ease with which an operator can handle the camera. Additionally the large magnetic fields such as the earth magnetic field affect all three tubes in the same manner to thereby substantially prevent television picture imbalances as a result of such fields and as are encountered in many prior art cameras.

However, the optical system provided by the present invention, and particularly the use of the described dichroic filters provides a highly efficient color beam splitting with virtually no light absorption. The efficiency of the color beam splitting system is therefore substantially higher than that provided by prior art color television cameras and thus helps reduce the required level of illumination for obtaining useable outputs from the camera. The filters are optically stable, that is, they have relatively small masses so that image impairing or distorting effects caused by temperature variations are virtually non-existent. There is, therefore, no longer a need for long camera warm-up periods before it can be satisfactorily used.

The components of the optical system of the present invention are mounted to a relatively massive, high strength base or optical bench which also mounts the remainder of the camera. Since the components are directly mounted to the same base, variations or distortions of the various images from shock, vibration or temperature differentials are virtually eliminated.

DESCRIPTION OF THE PREFERRED EMBODIMENTS

Figure 1:
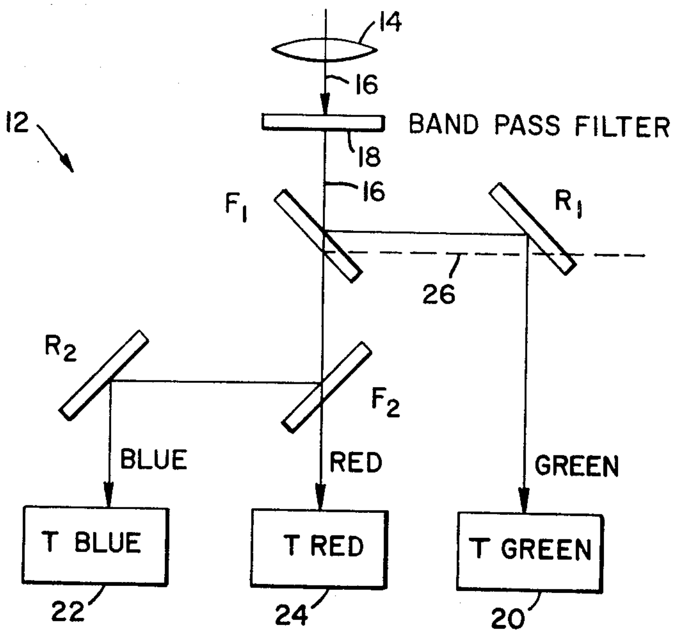
FIG. 1 is a schematic view illustrating the optical system of the present invention.
Figure 2:
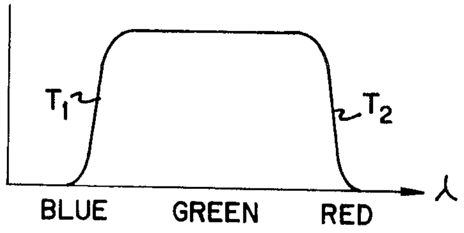
FIG. 2 diagrammatically illustrates the composition of the light passing the band pass filter of the system illustrated in FIG. 1.

Referring first to FIGS. 1 through 5, an optical system 12 constructed in accordance with the present invention briefly comprises an optical aperture or lens 14 which has an optical axis 16 that extends through a color television camera (not separately shown in FIGS. 1 through 5) and which directs ambient light onto a band pass filter 18. The filter removes ultraviolet and infrared portions of the incoming light and passes the image projected by the lens consisting of spectral light between blue on the short wave side and red on the long wave side between first and second cutoff points or trim edges $T_1$ and $T_2$ as graphically illustrated in FIG. 2. A first dichroic filter $F_1$ reflects the green portion of the incoming light image between green trim edges $T_{g1}$ and $T_{g2}$ and permits passage of the remaining incoming light image. The dichroic filter is positioned on optical axis 16 optically downstream of the band pass filter. A second dichroic filter $F_2$ is positioned on the optical axis downstream of the first filter and reflects light to the left of cutoff line $T_B$ while transmitting light having a wavelength above that indicated by transmission line $T_R$.

Since the first filter does not transmit green light cutoff lines $T_B$ and $T_R$ of the second dichroic filter need not be closely controlled. The second filter reflects all blue light transmitted by the first filter and by the band pass filter 18 while it transmits all red light received from the first and the band pass filters. Consequently, the second dichroic filter exercises no control over the light trim edges.

Mirrors or reflectors $R_1$ and $R_2$ are positioned to direct the light reflected by filters $F_1$ and $F_2$, respectively, parallel to optical axis 16 towards a green television tube 20 and a blue television tube 22. A red television tube 24 is optically aligned with optical axis 16, is mounted optically downstream of dichroic filter $F_2$ and receives the red image portion passed by the second dichroic filter. The green and blue television tubes are mounted adjacent and parallel to the red tube and, respectively, receive the green and blue image portions reflected by the filter-reflector combinations $F_1$, $R_1$ and $F_2$, $R_2$.

The dichroic filters comprise relatively thin, suitably treated glass discs which are inclined with respect to optical axis 16 at 45° so that the incident light strikes the reflecting surfaces of the filters at such angle. Similarly, reflectors $R_1$, $R_2$ comprise flat reflection surfaces inclined with respect to the incident light at 45°. This positioning of the filters enables the parallel positioning of the television tubes with the resulting, above referred to space savings.

Figure 3:
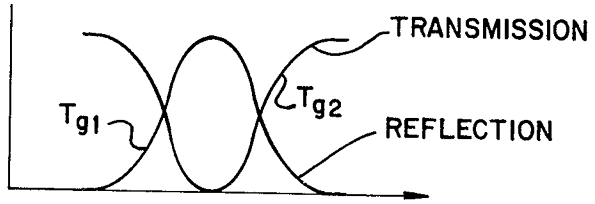
FIG. 3 is a diagrammatic illustration of the light reflection and transmission of the first dichroic filter of the system illustrated in FIG. 1.
Figure 4:
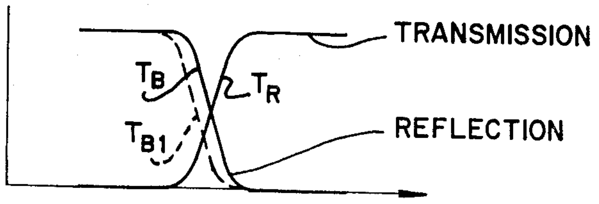
FIG. 4 is a diagrammatic illustration of the light reflections and transmission of the second dichroic filter in the system illustrated in FIG. 1.
Figure 5:
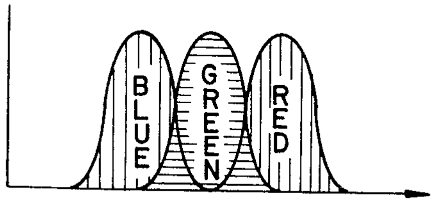
FIG. 5 is a diagrammatic illustration of the color images obtained with the optical system illustrated in FIG. 1.

Filter $F_1$ is constructed so that it reflects light within the downwardly opening reflection curve $T_{g1}$ of FIG. 3 while it transmits light beneath the upwardly opening transmission curve $T_{g2}$ illustrated in FIG. 3. The second dichroic filter $F_2$, on the other hand, is a band splitting filter that transmits light beneath the transmission curve in FIG. 4 and reflects light beneath the reflection line of FIG. 4. The two lines intersect at about the center of the total light transmission curve. Since green has already been removed from the light received by the dichroic filter blue only is reflected and red only is transmitted. Thus, each of the three color image receiving television tubes receives only green, red or blue, respectively, as determined by the characteristics of the filters and as schematically illustrated by the areas beneath the separation lines indicated schematically in FIG. 5.

The green reflecting dichroic filter frequently produces a small secondary reflection indicated by phantom line 26 in FIG. 1 which originates on the back or downstream side of the filter. This secondary reflection is comprised of light other than green light and can cause a ghost image in the green television tube 20 unless removed. Reflector $R_1$ is therefore preferably not a conventional surface mirror but a green reflecting dichroic filter which reflects the green image portion received from filter $F_1$ while it passes the secondary reflection comprised of light other than green. The occurrence of ghost images is thereby eliminated.

The color balance of the television camera when all light reflected by dichroic filter $F_2$ is transmitted to blue television tube 22 often contains an excessive amount of light in the vicinity of the green light wavelength. Reflector $R_2$ is, therefore, constructed as a trim mirror which removes a narrow blue color band at the border line to green light (in the vicinity of a wavelength of about 5,000 angstrom) of a band width of about 200 to 300 angstrom. The trim line (TBI) is clearly shown in FIG. 4.

Figure 6:
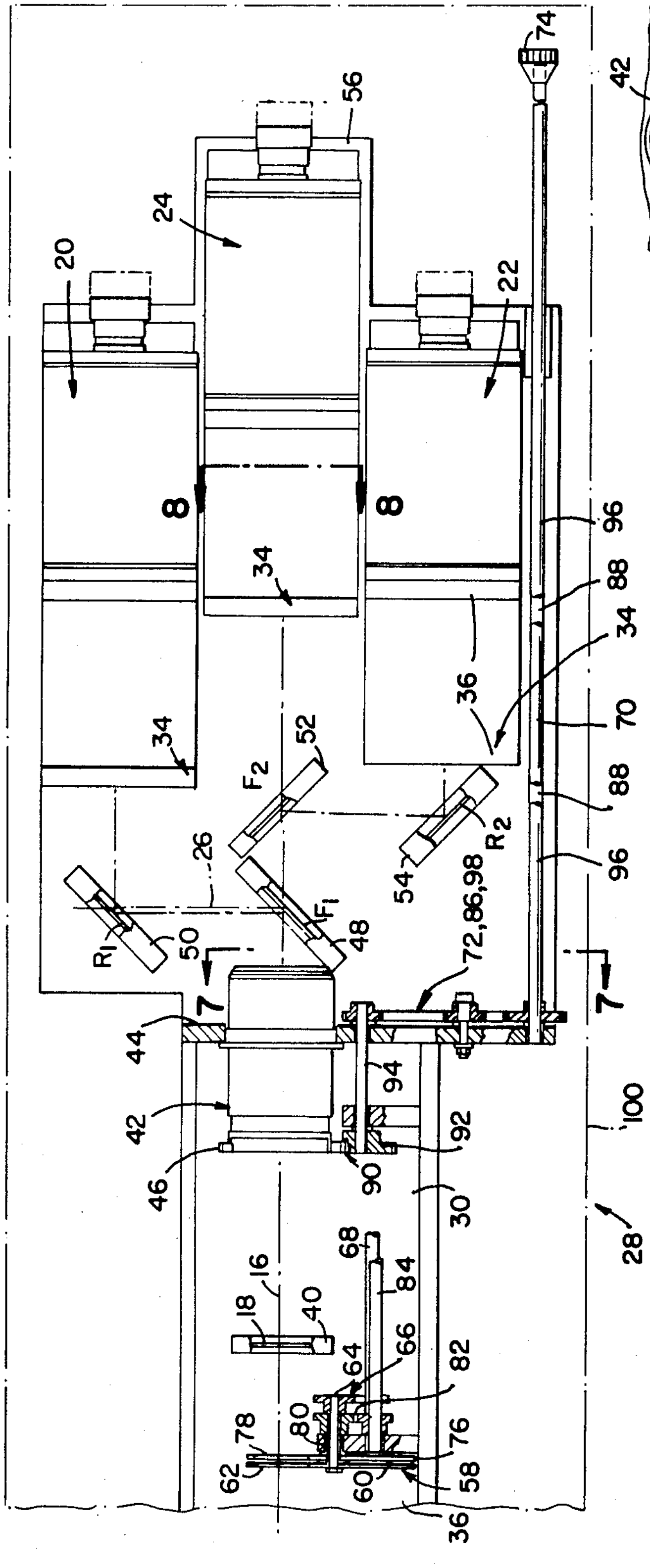
FIG. 6 is a plan view of the optics and the arrangement of the television tubes in a color television camera constructed in accordance with the invention.
Figure 7:
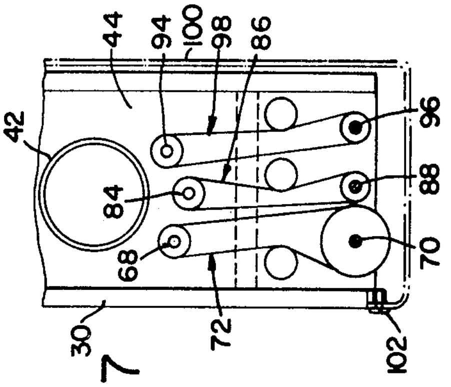
FIG. 7 is a fragmentary side elevational view and is taken on line 7—7 of FIG. 6.
Figure 8:
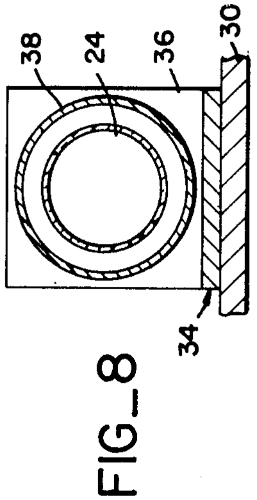
FIG. 8 is a fragmentary side elevational view of the shielding for the television tubes mounted to the camera illustrated in FIG. 6 and is taken on line 8—8 of FIG. 6.

FIGS. 6 through 8 show a practical embodiment of the optical system illustrated in FIG. 1. A television camera 28 constructed in accordance with the present invention incorporates the optical system illustrated in FIG. 1 by first providing a relatively massive and strong base or optical bench 30 to which the green, blue and red television tubes 20, 22, and 24, respectively, are mounted so that red tube 24 is optically aligned with the optical axis 16 through the camera while the green and blue tubes 20 and 22, respectively, are positioned with their axes parallel to the optical camera axis. The tubes are mounted to tube holders 32 secured to the optical bench which have upwardly extending tube supporting members 34. A magnetic shielding in the form of a generally tubular, metallic sleeve 38 is clamped between the upright tube supporting members and is disposed about the tube to minimize the effects of earth magnetism on the television tubes and particularly on the electron image producing forward portions of the tubes.

Band pass filter 18 mounted in a holder 40 adjacent a forward end 36 of the optical bench is aligned with optical camera axis 16 and prevents ultraviolet and infrared portions of the light entering the camera from reaching a fine adjustable lens assembly 42 disposed optically downstream of the band pass filter. Lens 42 is mounted to a transverse bulk head 44 directly supported on optical bench 30 and includes a concentric gear assembly 46 for remotely focusing the lens as more fully described hereinafter.

Trichroic filter $F_1$ is mounted to a holder 48 suitably secured to optical bench 30 as with threaded bolts (not separately shown) and precisely positioned with dowl pins (not separately shown) or the like at 45° to the optical camera axis. Trichroic filter $F_1$ reflects the green image portion perpendicularly to optical camera axis 16 to reflector $R_1$ mounted to a holder 50 also dowled and bolted to optical bench 30 for proper positioning. The reflector $R_1$ is inclined 45° to incident light and reflects it parallel to optical camera axis 16 to green television tube 20.

Immediately aft the dichroic filter $F_1$ is a dichroic filter $F_2$ also aligned with optical camera axis 16 and inclined thereto 45° for reflection of the blue light image portion perpendicularly to the optical axis onto reflector $R_2$. The dichroic filter $F_2$ and the second reflector $R_2$ are mounted to holders 52 and 54, respectively and dowled and bolted to the optical bench in the same manner as the holders for the first dichroic filter and reflector. Red light passing the dichroic filter enters red television tube 24 while the reflected blue image portion is directed parallel to the optical camera axis into blue television tube 22.

The high efficiency optical system 12 of the present invention is particularly well adapted for use in combination with high sensitivity, image intensifying television tubes such as the above referred to Westinghouse WL-30893 SEC Camera Tube. The parallel mounting of the tubes together with the magnetic shielding applied thereto not only minimizes the effects of exterior magnetic fields on the tube output signals but assures that such fields, particularly the earth magnetic field, effects all three tubes in the same manner to virtually eliminate color imbalances caused by such fields. The mounting of the system on a common, massive and relatively high strength optical bench furthermore assures image stability and continued image alignment. Physically, the optical system of the present invention and its mounting to the optical bench, and particularly the elimination of the parallel positioning of the television tubes on the bench enables the construction of a compact camera.

To enable control of the incoming light intensity from adjacent the aft end 56 of optical bench 30 where the camera operator is positioned the present invention also provides light dimming and filtering means 58 which are operable from adjacent the aft end of the bench. They comprise a disc 60 rotatably mounted to the optical bench adjacent forward end 46 thereof and having a plurality of neutral density filters 62 of varying strength arranged adjacent the outer periphery of the disc. The axis of the disc is parallel and laterally offset from optical camera axis 16 a distance so that rotation of the disc sequentially aligns the neutral density filters with the optical camera axis. The intensity of the incoming light can thus be varied.

A shaft 64 mounts and rotates disc 60 and is driven via a gear train 66 by a rearwardly extending, elongate shaft 68 that projects past bulk head 44. The elongate shaft is driven by a drive shaft 70 via a chain drive 72. Drive shaft 70 extends rearwardly from bulk head 44 and terminates in a knob 74 for actuation of the neutral density filter disc 60 by the camera operator.

A second disc 76 mounting a plurality of color filters 78 is coaxially mounted with neutral density filter disc 60, secured to a hollow shaft 80 and driven via a gear train 82 for rotatably moving the color filters into alignment with the optical camera axis 16. One of the apertures in the disc that can be rotated into alignment with the camera axis is empty for admitting unfiltered light into the camera.

Gear train 82 is driven via a rearwardly extending shaft 84 protruding through bulk head 44, chain drive 86 and a drive shaft 88 also extending to the rear end of the camera, terminating in a knob for actuation by the camera operator in substantially the same manner as the drive for the neutral density filter disc.

For focusing lens 42 a lens drive 90 is provided that rotates lens gear assembly 46 in one or the other direction via a drive gear 92 mounted to a shaft 94 extending past bulk head 44. Drive gear 92 is actuated from the aft end by the camera operator in the above described manner via an elongate, rearwardly extending drive shaft 96 and a chain drive 98.

Thus, the present invention provides an optical system for color television cameras which is not only optically highly efficient and stable but it is also practical for use by the operator and enables him to virtually instantaneously control the light input into the camera. The remainder of the camera, and particularly the supporting electronics, monitoring screen and the like are mounted to and/or within a housing 100 suitably supported by optical bench 30 as with threaded bolts 102. The optical bench itself is mounted to a camera support stand (not shown) and is therefore rigidly held to reduce vibrations and the like which might develop within the relatively flexible housing if the bench or optical system were partially or wholly mounted to the housing instead of to the support stand.

I claim:

1. In a color television camera having a lens for forming an image, a first television tube for receiving a green image portion from the lens, a second television tube for receiving a red image portion from the lens and a third television tube for receiving a blue image portion from the lens, the improvement comprising: a first dichroic filter placed in the optical path from the lens for separation of the green image portion from the lens image, the first dichroic filter having a reflecting surface oriented at an angle of about 45° with respect to incoming light, the first dichroic filter being constructed so that its spectral transmission and reflection characteristics remain substantially constant when incoming light of wavelengths in the neighborhood of the reflection cut off wavelength of the first dichroic filter is polarized, a second dichroic filter disposed optically downstream of the first dichroic filter and receiving a remainder of the lens image, the second dichroic filter separating the remainder into the blue and red image portions, and means transmitting the respective image portions to the corresponding tubes.

2. A television camera according to claim 1 wherein the the first and second dichroic filters are linearly aligned with the lens, wherein each filter reflects one image portion, and including reflecting means directing the reflected image in a direction parallel to the optical path, and means positioning the tubes parallel to the optical path to substantially uniformly subject the tubes to earth magnetism.

3. A television camera in accordance with claim 2 wherein the reflecting means for the green image portion comprises mirror means for deflecting the green image portion only disposed in the path of the green image portion reflected by the first dichroic filter to thereby eliminate ghost images resulting from the reflection of light other than green light by a surface of the first dichroic filter opposite a green reflecting surface of the first filter.

4. A television camera according to claim 1 wherein the second dichroic filter reflects the blue image portion and passes the red image portion, and including means for trimming a part of the blue image portion having a wavelength close to a wavelength of the green image portion reflected by the first dichroic filter.

5. A high sensitivity color television camera usable under low light intensity conditions for the production of color television signals from light of minimal polarization and with substantially no color signal imbalances due to the effects of relatively large magnetic fields acting on television tubes of the camera comprising: a rigid optical bench, parallel image intensifying television tubes mounted to the bench for minimizing the greatest distance between the tubes and assuring uniform effects of large magnetic fields on tube output signals, means forming a magnetic shield about the tubes, optical aperture defining means carried by the bench for forming an image, means carried by the bench for the removal of light of the wave lengths other than wave lengths to be received by the tubes, first means optically downstream of the removal means for splitting off a first light image of a wave length intermediate the upper and lower wave lengths defined by the light removal means and directing the first split-off light image to the corresponding tube, second means optically downstream of the first means and splitting light waves received from the first means into light images having first trim edges defined by the upper and lower wave lengths passing the light removal means, having second trim edges defined by the reflection characteristic of the first split-off means and directing the light images to second and third tubes, and means mounting the split-off means to the bench.

6. A color television camera according to claim 5 wherein at least the first split-off means comprises filter means having a reflective surface for the reflection of a color image with closely controlled trim edges, and wherein the reflective surface is constructed so that the spectral transmission and reflection characteristic of the split-off means is substantially insensitive to light polarization whereby the light wave band of the reflected and transmitted images is substantially unaffected when incoming light includes polarized light and the angle of incidence of the incoming light on the reflecting surface is about 45°.

7. A color television camera according to claim 6 including means eliminating a double reflection effect from at least one of the first and second split-off means to prevent the formation of ghost images in the tubes.

8. A color television camera in accordance with claim 5 wherein the television tubes are secondary electron conduction vidicon tubes.

9. A color television camera according to claim 5 including filter means and means for selectively passing the filter means into the optical path of the aperture defining means for filtering light of a predetermined wave length.

10. A color television camera according to claim 5 including reflectors between the first and second split-off means and at least some of the tubes for directing color light images to such tubes, and wherein the first and second split-off means comprises a filter reflecting light of a certain wave length and permitting the passage of other light, and wherein the reflecting surfaces of the filters and the reflectors are disposed at 45° to the incident light.

11. A color television camera comprising: an optical bench, means mounted to the camera defining an optical camera aperture and an optical axis through the camera, a blue image receiving television tube, a green image receiving television tube and a red image receiving television tube, means mounting the tubes to the bench, orienting the tube axes parallel to each other and aligning one of the tubes with the camera axis, first and second light filter means reflecting light of a certain color band and passing light of another color band, the first and second filter means being spaced along the camera axis, means mounting the filter means to the bench and positioning the filter means for reflection of a light color band for one of the tubes and passage of a remainder of the image striking the filter, means positioned in an optical path of reflection from the filter means directing reflected light color bands to corresponding tubes, and means mounting the mirror means to the bench.

12. A color television camera according to claim 11 including magnetic shielding placed over the television tubes and secured to the bench.

13. A color television camera according to claim 11 including a band pass filter aligned with the camera axis, mounted to the bench and preventing the passage of ultraviolet and infrared light to the first and second filter means.

14. A color television camera according to claim 11 wherein the mirror means opposite at least one of the filter means comprises a reflector reflecting the respective incoming color image only to the corresponding color tube and thus eliminating the transmission to the tube of a ghost image reflected by the opposing filter means.

15. A color television camera according to claim 11 wherein one of the filter means reflects a light color band comprising the blue color image of the image projected by the optical camera aperture defining means, and wherein the mirror means includes means trimming a relatively long wavelength portion of the reflected blue image.

16. A color television camera according to claim 11 including neutral density filters mounted to a rotatable support, means mounting the support to the optical bench so that the neutral density filters can be aligned with the camera axis optically upstream of the filter means, and means for operating the neutral density filter mounting means from adjacent an end of the optical bench opposite the end adjacent the aperture defining means.

17. A color television camera according to claim 16 including at least one color filter mounted to rotatable means, means securing the rotatable means to the bench optically upstream of the filter means so that the color filter can be aligned with the camera axis, and means coupled to the rotatable means for actuating the rotatable means from adjacent the bench end remote from the aperture defining means.

18. A color television camera in accordance with claim 17 including a fine adjustment lens disposed in the camera axis upstream of the filter means, means mounting the fine adjustment lens to the bench, and means for adjusting the fine adjustment lens from adjacent the optical bench end remote from the aperture defining means.

* * * * *